July 12, 1960 L. G. HALL ET AL 2,945,124
FORMATION OF ELECTRICAL FIELDS
Filed Aug. 4, 1955 3 Sheets-Sheet 1

INVENTORS.
LAWRENCE G. HALL
WILSON M. BRUBAKER
BY
Christie, Parker & Hale
ATTORNEYS July 12, 1960 L. G. HALL ET AL 2,945,124
FORMATION OF ELECTRICAL FIELDS
Filed Aug. 4, 1955 3 Sheets-Sheet 2

INVENTORS
LAWRENCE G. HALL
WILSON M. BRUBAKER
BY
Christie, Parker & Hale
ATTORNEYS

2,945,124

FORMATION OF ELECTRICAL FIELDS

Lawrence G. Hall, West Covina, and Wilson M. Brubaker, Arcadia, Calif., assignors, by mesne assignments, to Bell & Howell Company, Chicago, Ill., a corporation of Illinois Filed Aug. 4, 1955, Ser. No. 526,356

4 Claims. (Cl. 250—41.9)

This invention relates to improvement in conductively coated insulators and to the application of such improved coated materials to the formation of electrical fields.

Insulators, such as glass having a conductive film baked into one surface, are commercially available. These coated insulators are available in several ranges of resistivity and are physically stable to moderate abrasion influences. The conductive material coated on the insulator can be a substance such as a tin chloride which is applied in a thin layer to obtain the conductive surface. Such a coating may be obtained by spraying a glass plate while it is heated to an elevated temperature below that at which the glass becomes molten with a tin salt such as tin tetrachloride in the presence of a reducing agent. The techniques of producing such conductive coatings are known commercially and form no part of the present invention. Highly conductive bus bars may be disposed along opposing boundaries of the coated surface to provide means for impressing a potential across the surface.

Present limitations on the use of such commercially available coated insulators are a result of unwanted non-uniformity of resistance occurring across the surface. Thus, it is generally desirable that the voltage drop across the surface be in accordance with a predetermined distribution, and the present inability to achieve a coating exhibiting the desired accuracy in this respect places a limitation on the utility of these materials.

There are many applications where uniform potential gradients across a region are of considerable importance and where uniformity is very critical. One such application, for example, is in certain forms of mass spectrometers wherein ion movement in an analyzer section is controlled by means of electrical fields established in the analyzer. The quality of operation of such an instrument is, in appreciable measure, determined by the uniformity of this electrical field. Double focusing mass spectrometers are examples of instruments of this type.

We have now found means whereby the potential distribution of coated conductive surfaces can be made more uniform to the point where such materials can be employed in the formation of shaped fields as, for example, in mass spectrometers. In one aspect the invention contemplates apparatus for establishing a determined and a substantially linear potential distribution across a region which comprises an insulator having one surface defining a boundary of the region, a conductive coating of predetermined nominal resistivity disposed on said surface, bus bars of lower resistivity than said coating conductively contacting the coating at spaced locations, the bus bars forming means for applying a potential across the coating. In order to develop an electrical field of required accuracy with the conductively coated materials now available, additional conductors are disposed across the surface of the coating in electrical contact therewith and between the bus bars. The additional conductors in order to serve the desired end must be of greater conductivity per unit area of covered surface than the underlying coating.

By scribing or otherwise forming lines or strips of high conductivity across the higher resistance coating between the points of potential injection, potentials along a given line are brought to the same value and unwanted variations in the potential distribution across the coating are minimized. These high conductivity strips produce more correctly oriented equipotential lines resulting in a greater uniformity of potential distribution.

The desired potential distribution may be linear across the conductive surface or it may be non-linear, and in either case the surface may be flat or it may be curved. Whether the designed potential distribution is linear or non-linear, the superimposed conductive lines or strips are oriented to insure the proper distribution and shape of the equipotential lines.

The greater the number of such conductive lines, the closer to the desired configuration will be the potential gradient, but the number of such lines is limited by the potential difference required across the surface. If the areas of non-uniformity are large relative to the system, further compensation in addition to the conductive strips is sometimes necessary. In such cases, potentials may be distributed between or applied directly to these intermediate conductive strips by means of resistors externally connected between the bus bars and the conductive strips or by other circuit techniques. The values of these resistors need not be equal to each other nor of lower value than the surface, but only of such value to correct the equipotential lines to their desired value.

By means of this invention, coated surfaces can be made to exhibit a sufficiently controlled potential distribution in the presence of an applied potential to be attractive for use in certain instruments which depend upon shaped fields for their operation. It is important to note that our invention makes possible the formation of fields of controlled uniformity or non-uniformity and of planar or non-planar shape. Thus by distributing the potential between the superimposed conductive lines any desired field distribution can be substantially obtained and can be accurately controlled. Similarly, this control can be accomplished on curved conductive surfaces as well as on flat surfaces. One example of the use of these curved surfaces is in a linear accelerator.

In a cycloidal mass spectrometer, ions are subject to the influence of magnetic and electrical fields disposed normal to each other. Under the influence of these fields, and as explained in greater detail in co-pending application Serial No. 497,097, now Patent No. 2,845,539, filed by Charles F. Robinson on March 28, 1955, ions are caused to travel in a trochoidal path, the size of which is a function of the electrical and magnetic field strengths and the ion mass. By locating a collector electrode at a distance from the source of ion injection into the analyzer region so as to intercept ions after one complete cycle of cycloidal motion, ions of any given mass may be selectively collected at the collector electrode by suitable control of the electrical and magnetic fields.

It is highly important in such an instrument that the electrical field be established with a considerable degree of uniformity, in this instance with substantially linear potential distribution from boundary to boundary. Heretofore it has been the practice to define the boundaries of an analyzer region in a cycloidal mass spectrometer by a plurality of separate electrode plates mounted parallel to each other and insulated from each other with the field forming potential distributed across the several plates. This arrangement produces an electrical field which is limited in its uniformity by the obvious stepwise application of the potentials. Moreover, because of this stepped potential at its boundaries, an electrical field established by means of spaced electrodes exhibits a relatively small effective region of ion travel through the analyzer. At the same time, magnet means must be provided to establish a magnetic field across the entire analyzer and not just in the effective region of the electrical field. Such extensive magnetic field requirements are uneconomical.

We have now found that such a mass spectrometer may be constructed by enclosing and forming the analyzer region with conductive surfaces of the type above described. This application is presently made possible by virtue of the means herein disclosed for accurately controlling the potential across such surfaces. By replacing the cumbersome field forming electrodes with conductive wall plates, the ratio of ion beam size to magnetic field size is greatly increased and magnet requirements are correspondingly reduced. At the same time the distribution of the developed field is more accurately controllable with a consequent operational improvement.

The invention will be more clearly understood from the following detailed description thereof taken in conjunction with the accompanying drawing, in which.

Figure 1:
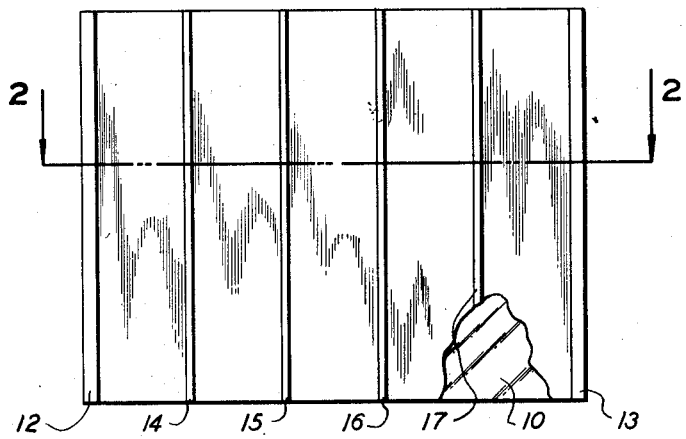
Fig. 1 is a plan view of a conductively coated insulator member in accordance with the invention.
Figure 2:
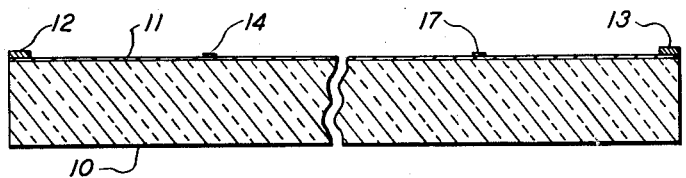
Fig. 2 is an enlarged sectional elevation taken on the line 2—2 of Fig. 1.

Referring to Figs. 1 and 2, a conductively coated insulator in accordance with the invention comprises a plate 10 of insulating material such as glass or quartz upon which a coating 11 of conductive material such as tin chloride or the like is applied and preferably is actually baked into the surface of the glass plate 10 as is presently conventional practice. The manner of applying such coating is not within the scope of this invention, nor is the invention in any way limited in this respect. In order that the coating 11 exhibit a sufficient resistivity, it is applied in a very thin layer. Highly conductive bus bars 12 and 13 are formed in electrically conductive contact with the coating 11 adjacent its boundaries. By means of these bus bars a potential can be applied across the coated surface.

To this extent the coated member 10 shown in Figs. 1 and 2 is entirely conventional and may at the present time be purchased commercially. However, to achieve a product usable as herein described, we have found it necessary to modify the presently conventional material by applying narrow strips 14, 15, 16 and 17 of highly conductive material in good electrically conductive contact with the coating 11 and disposed in spaced relation between the bus bars 12 and 13. The strips 14, 15, 16 and 17 may, for example, be approximately .001" thick and approximately .010" wide and may be silver, copper, platinum or other highly conductive material. Conveniently a suspension of metal powder or a solution of a decomposable salt such as platinum tetrachloride may be applied with a ruling pen or the like. The pure metal may then be developed by heating. Alternatively, and because the surface upon which the conductive strips are to be formed is itself conductive to a degree, metallic lines of the desired dimension may be applied by conventional plating techniques.

If the coating 11 between the bus bars 12 and 13 were absolutely uniform in its electrical conductivity, a plot of equipotential lines between the bus bars would constitute a plurality of straight evenly spaced lines, and such plotted lines might take on the appearance of the conductive strips 14, 15, 16 and 17. However, because it appears presently impossible to achieve such desirable uniformity of electrical properties in the coating, actual equipotential lines plotted between the bus bars 12 and 13 will deviate from the ideal straight line parallel orientation or from any predetermined nominal distribution. We have found that the conductive strips 14, 15, 16 and 17 tend to form straight equipotentials or, in other words, minimize to a large extent the effect of the non-uniformity of the electrical properties of the conductive coating.

The superimposed conductive strips may be applied in any pattern or configuration to achieve a shaped field as desired. If a non-linear regular potential distribution between the terminal bus bars is sought, the coating can be applied in such a manner as to approximate such non-linear distribution and the conductive strips scribed or otherwise formed therein to produce the uniformity required in the non-linear development. For example, a logarithmic distribution is readily obtainable by varying the thickness of the coating to approximate a logarithmic resistivity change across the surface. A more accurate potential distribution in accordance with this predetermined pattern is achieved by disposing conductive lines in spaced parallel orientation across the surface.

If it is desired to employ the superimposed conductive strips as an aid to accomplishment of a desired potential distribution across the surface whether linear or non-linear, the strips may be incorporated in the electrical circuitry in such a fashion that intermediate potentials are distributed over these conductive lines. Such connection can readily be such as to apply linear or non-linear potential gradients between the spaced conductors.

Figure 3:
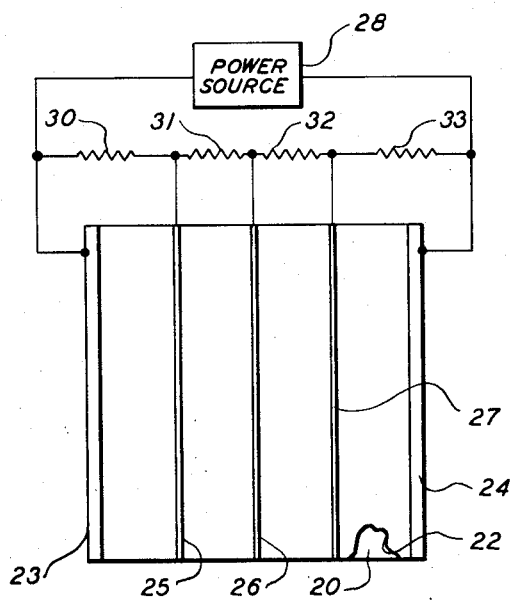
Fig. 3 is a plan view of one form of electrical connection to a conductively coated insulator in accordance with the invention.

Such a system is shown in Fig. 3 wherein an insulator member 20 is provided with a conductive coating 22, the boundaries of which are defined by bus bars 23, 24 in electrically conductive contact with the coating. A plurality of conductive lines 25, 26, 27 are scribed across the surface of the coating 22 in the same manner as described in relation to Fig. 1. A power source 28 is connected across the bus bars 23, 24 in conventional manner and the several conductive lines 25, 26 and 27 are interconnected to the power source through a resistance series 30, 31, 32, 33 so that a predetermined fraction of the potential is applied to each of these conductive lines. The technique further insures accurate distribution of the equipotential lines across the coated surface between bus bars 23, 24. Other known means such as printed circuitry may be employed to distribute potentials between the superimposed conductors.

Figs. 1, 2 and 3 illustrate the invention as adapted to flat coated surfaces. There is no such limitation inherent in the described improvements which may be embodied with equal facility with coated curvilinear or other configured surfaces.

By virtue of the uniformity of the potential distribution across the coated surface achieved as described, we are able to employ such coated surfaces in shaping electrical fields, as for example in mass spectrometry. To this end, application of the invention to a cycloidal mass spectrometer is illustrated and described. The type of mass spectrometer is considered only by way of example, the invention being in no way limited to any particular mass spectrometer configuration or even to mass spectrometry as such.

Figure 4:
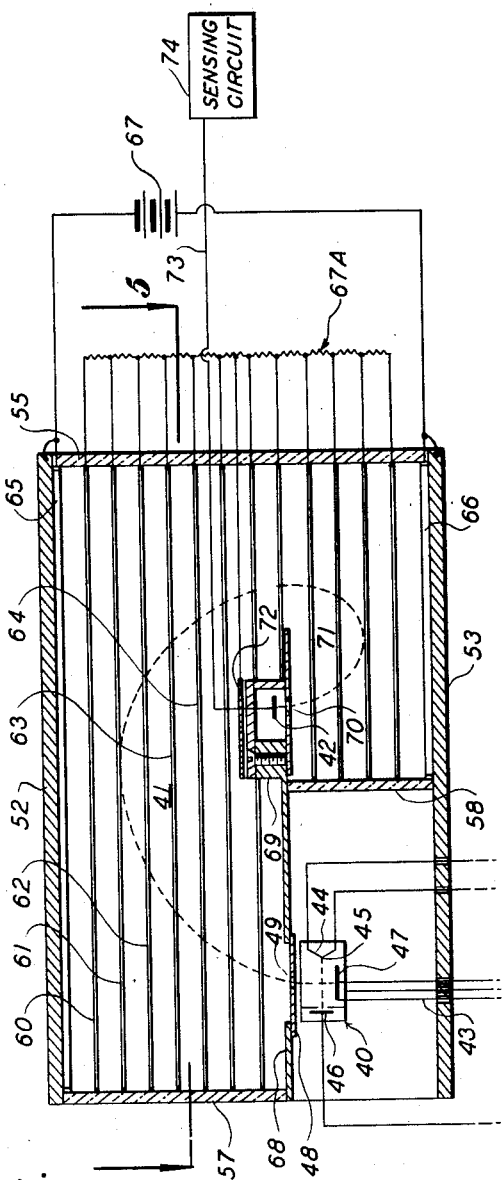
Fig. 4 is a schematic longitudinal sectional elevation of a cycloidal mass spectrometer.
Figure 5:
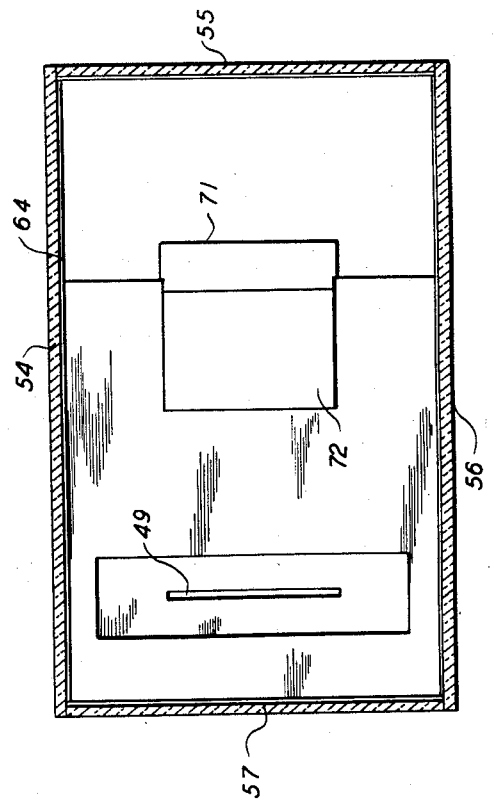
Fig. 5 is a horizontal section taken on the line 5—5 of Fig. 4.

In Figs. 4 and 5 a cycloidal mass spectrometer is shown schematically in longitudinal and horizontal section, respectively. The illustrated mass spectrometer comprises an ion source 40, an analyzer chamber 41, and an ion collector 42, all disposed within an evacuable envelope (not shown) which in turn is immersed in a magnetic field developed by magnet means (not shown). A sample inlet 43 gives access through the envelope into the ion source 40. The ion source is shown schematically as including an electron gun 44 positioned to direct an electron beam 45 across an ionization region to an electron target 46. In the drawing the electron gun is 90° out of position relative to the orientation of the ion trajectory and is so illustrated schematically for purposes of clarity. A repeller electrode 47 and an accelerating electrode 48 provide means for establishing a potential to cause ions formed by the beam 45 to pass through aperture 49 in the accelerator electrode into the analyzer 41.

In this instrument the analyzer consists of a housing made up of top and bottom electrically conductive plates 52, 53 and side plates 54, 55, 56, 57 and 58. Each of the sides plates comprises an insulating plate, for example glass, upon which a conductive coating has previously been formed. A plurality of evenly spaced conductive lines 60, 61, 62, 63, 64, etc. are formed on the plate 54 and similar conductive lines are formed on each of the other coated boundary plates so that the entire analyzer region 41 is circumscribed by a plurality of conductive rings formed by the continuity of aligned conductive lines on each of the boundary coated plates.

Each of the plates is also provided with the usual conductive buses 65, 66 at opposite edges across which a potential is applied from a source 67. Preferably the same potential is applied between end plates 52, 53, as illustrated, to define the upper and lower extremities of the field. To obtain optimum potential distribution across the plate surfaces, and therefore within the analyzer 41, potentials obtained from a potential divider 67A composed of suitable resistors are applied to the several conductive lines 60, 61, 62, etc. Conveniently for this purpose, the corresponding conductive lines on each boundary plate are connected by suitable jumper strips. Since it is important in this form of mass spectrometer that the field developed in the analyzer be uniform, equal fractions of the total E.M.F. are applied to the several equally spaced conductive strips. The same end result can of course be achieved if the conductive strips are unequally spaced by adjusting the applied voltages in a compensating manner.

The median or focal plane of the instrument is formed by a plate 68 through which the ions from the ion source have access to the analyzer region and with which is formed a housing 69 for the collector 42. A resolving aperture 70 is formed in a closure plate 71 across the face of the collector housing 69. A compensating plate 72 is used to correct the disturbance in the electrical field inherent on the presence of housing 69. The plate 72 is conveniently connected to an appropriate point on the voltage divider 67A.

The collector electrode is connected through an external lead 73 to a current sensing circuit 74 which may be of conventional type.

The operation of the apparatus illustrated in Figs. 4 and 5 is that of a conventional cycloidal mass spectrometer. The envelope (not shown) enclosing the schematically illustrated portion of the instrument is evacuated and a magnetic field is established by magnet means (not shown), this field being normal to the plane of Fig. 4. A gas sample introduced through conduit 43 is ionized in the ionization source 40 and is propelled into the analyzer 41. Under the influence of the crossed electrical and magnetic fields, all ions will travel in trochoids, and ions of a given mass determined by the operating variables will focus on the resolving slit 70 for collection and discharge at the collector electrode 42. This discharge is sensed and measured in conventional fashion by the current sensing circuit 74.

Although in its general aspects the operation of the instrument is similar to that of a conventional cycloidal instrument, the device has been greatly simplified by the elimination of the multiplicity of expensive metal electrodes by means of which the electrical field has heretofore been established. At the same time the usable portion of the electrical field is relatively greater, which correspondingly reduces the size of magnet necessary to develop a given magnetic field. In addition to simplifying the construction of the instrument, the field distribution has been improved and can be made to approach practical perfection by the techniques described.

In this particular form of mass spectrometer a uniform field distribution is desired and, accordingly, potential distribution across the plates defining the analyzer region is maintained linear. If in another device a differently shaped field is required, a field of any desired configuration can be approximated by varying potentials applied to the superimposed conductive strips formed thereon in accordance with this invention. Similarly coated curvilinear surfaces modified as described may be employed.

Figure 6:
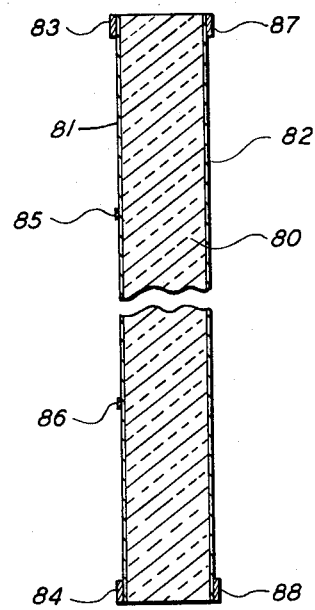
Fig. 6 is an enlarged sectional elevation of a conductively coated plate provided with a second conductive coating for heating purposes.

Further use can be made of heated conductive surfaces, as again for example in mass spectrometry. This application of the invention is illustrated in two embodiments in Figs. 6 and 7. In Fig. 6 insulator plate 80 is illustrated as provided with a conductive surface 81 for formation of a uniform electrical field and on the reverse side with a conductive surface 82 for heating the insulator plate. The conductive coating 81 is provided with boundary bus bars 83, 84 and equalizing conductive strips 85, 86, all as illustrated for example in Fig. 1. This face of the member 80 may be employed to define a boundary of the electrical field in a mass spectrometer. The opposite face of the insulator 80 is also provided, as above noted, with a conductive coating 82. Since this coating is to be used for heating purposes it may be of lower resistance than the coating 81, and, because of thermal properties of the support, it is not as necessary to have a uniform coating for heating purposes. It follows that the provision of super-imposed conductive lines for modifying irregularities in the conductive properties of the coating are not as important as in a situation where the coating is to be used for development of electrical fields. Bus bars 87, 88 are provided to apply the heating current across the surface 82.

Figure 7:
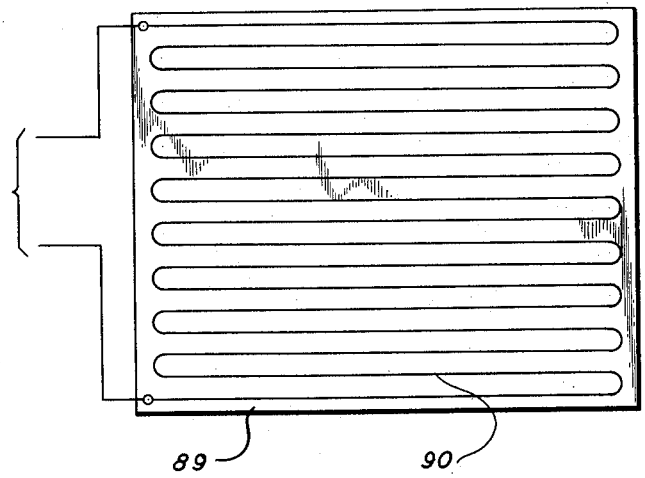
Fig. 7 is a back plan view of a conductively coated insulator provided with a heating coil mounted on its reverse surface.

In many applications a single strip is adequate for applying heat to one side of a conductively coated insulator. In Fig. 7 an insulator 89 having a conductive coating on the obscured face is provided with a conductor 90 meandering across the visible reverse surface and by means of which power is supplied to heat the insulator.

We claim:

1. Apparatus for establishing an electrical field of predetermined configuration in a given region which comprises an enclosure circumscribing and forming boundaries of the region, the enclosure having at least one uninterrupted insulating wall surface, a conductive film coated on a given area of said surface, bus bars adhered to said surface adjacent opposite boundaries of said area and in electrically conductive contact with the film, a voltage source, means for connecting the voltage source to the bus bars to apply a potential gradient across the film, and at least one additional continuous conductor extending across the film in electrical contact therewith and spaced from the bus bars, the additional conductor having a conductivity per unit area greater than that of the underlying film.

2. Apparatus for establishing an electrical field of predetermined configuration in a given region which comprises an enclosure circumscribing and forming boundaries of the region, the enclosure including a plurality of contiguous and uninterrupted insulating wall surface, a conductive film coated on each wall surface, a pair of bus bars adhered to each of said surfaces adjacent opposite boundaries and in electrically conductive contact with the film, a voltage source, means for connecting the voltage source to the pair of bus bars to apply a potential gradient across each surface and at least one additional continuous conductor extending across the film on each surface and in electrical contact therewith and spaced from the bus bars, the additional conductor having a conductivity per unit area greater than that of the underlying film.

3. Apparatus for establishing an electrical field of predetermined configuration in a given region which comprises an enclosure circumscribing and forming boundaries of the region, the enclosure including a plurality of continuous and uninterrupted insulating wall surface, a conductive film coated on each wall surface, a pair of bus bars adhered to each of said surfaces adjacent opposite boundaries and in electrically conductive contact with the film, a voltage source, means for connecting the voltage source across the pairs of bus bars to apply a potential gradient across each surface and a plurality of additional continuous conductors extending across each surface in electrical contact with the film and spaced from and parallel to each other and the bus bars, the additional conductors having a conductivity per unit area greater than that of the underlying film.

4. In a mass spectrometer means for establishing an electrical field of predetermined configuration in an analyzer portion which comprises an enclosure circumscribing and forming the boundaries of the analyzer portion, the enclosure including a plurality of contiguous insulating wall surfaces, a conductive film coated on each wall surface, a pair of bus bars adhered to each surface adjacent opposite boundaries thereof and in electrically conductive contact with the film, a voltage source, means for connecting the voltage source across the bus bar pair(s) to apply a potential gradient across each surface, a plurality of continuous conductors extending across the film on each surface in electrical contact therewith and spaced from and parallel to each other and the bus bars, the additional conductors having a conductivity per unit area greater than that of the underlying film, and means for applying to said conductors potentials respectively approximating the desired potentials of the film underlying the conductor.

References Cited in the file of this patent

UNITED STATES PATENTS

| | | |
|---|---|---|
| 2,658,150 | Backus et al. | Nov. 3, 1953 |
| 2,710,900 | Linder | June 14, 1955 |
| 2,817,831 | Johnson et al. | Dec. 24, 1957 |

UNITED STATES PATENT OFFICE
CERTIFICATE OF CORRECTION

Patent No. 2,945,124                          July 12, 1960

Lawrence G. Hall et al.

It is hereby certified that error appears in the printed specification of the above numbered patent requiring correction and that the said Letters Patent should read as corrected below.

Column 3, line 24, strike out "member in accordance with the invention;" and insert the same after "insulator" in line 26, same column; column 7, line 15, for "continuous" read -- contiguous --.

Signed and sealed this 10th day of January 1961.

(SEAL)
Attest:
KARL H. AXLINE
Attesting Officer

ROBERT C. WATSON
Commissioner of Patents